(12) United States Patent
Maruyama et al.

(10) Patent No.: US 10,155,663 B2
(45) Date of Patent: Dec. 18, 2018

(54) CARBON NANOTUBE FREESTANDING MEMBRANE, PROCESS FOR PRODUCTION OF THE SAME, COMPOSITES HAVING CARBON NANOTUBE MEMBRANES AND PROCESS FOR PRODUCTION THEREOF

(71) Applicants: The University of Tokyo, Bunkyo-ku, Tokyo (JP); DENSO CORPORATION, Kariya, Aichi (JP)

(72) Inventors: Shigeo Maruyama, Bunkyo-ku (JP); Yoichi Murakami, Bunkyo-ku (JP)

(73) Assignees: The University of Tokyo, Tokyo (JP); DENSO CORPORATION, Kariya, Aichi (JP)

(*) Notice: Subject to any disclaimer, the term of this patent is extended or adjusted under 35 U.S.C. 154(b) by 161 days.

(21) Appl. No.: 15/219,112

(22) Filed: Jul. 25, 2016

(65) Prior Publication Data
US 2016/0332884 A1  Nov. 17, 2016

Related U.S. Application Data

(62) Division of application No. 12/160,026, filed as application No. PCT/JP2007/050003 on Jan. 4, 2007.

(30) Foreign Application Priority Data

Jan. 5, 2006  (JP) ................................. 2006-000972

(51) Int. Cl.
*C01B 31/02* (2006.01)
*B82Y 30/00* (2011.01)
(Continued)

(52) U.S. Cl.
CPC .......... *C01B 31/0233* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS

| | | | |
|---|---|---|---|
| 6,808,746 B1 * | 10/2004 | Dai ........................ | B82Y 30/00 216/109 |
| 2003/0165418 A1 * | 9/2003 | Ajayan .................. | B82Y 30/00 423/447.2 |

FOREIGN PATENT DOCUMENTS

| | | |
|---|---|---|
| JP | 2000-109308 A | 4/2000 |
| JP | 2003-063813 A | 3/2003 |
| JP | 2003-171107 A | 6/2003 |

OTHER PUBLICATIONS

Yoichi, M.; Detachment of vertically aligned single-walled carbon nanotube films from substrates and their re-attachment to arbitrary surfaces; Mar. 8, 2006; Science Direct; 422; pp. 575-580.*

(Continued)

*Primary Examiner* — Tahseen Khan
(74) *Attorney, Agent, or Firm* — Christensen O'Connor Johnson Kindness PLLC

(57) ABSTRACT

The invention provides a composite comprising a substrate and a membrane of vertically aligned carbon nanotubes formed on the substrate which membrane is independent of the material of the substrate and a process for the production of the same. A process for producing the first composite comprising the first substrate and vertically aligned carbon nanotubes formed on the first substrate which comprises the step (a) of preparing the second composite comprising the second substrate made of quartz or silicon and vertically aligned carbon nanotubes formed on the second substrate, the step (b) of subjecting the second composite to water immersion wherein the temperature ($T_w$) of the water is higher than the temperature ($T_c$) of the second composite with a temperature difference $\Delta T\ (=T_w-T_c)$ of at least 25° C.

(Continued)

to make the carbon nanotubes peel off the second substrate and arrange them either in water or on the surface thereof, and the step (c) of arranging the resulting vertically aligned carbon nanotubes on the first substrate.

30 Claims, 6 Drawing Sheets

(51) Int. Cl.
  *B82Y 40/00* (2011.01)
  *C04B 35/52* (2006.01)
  *C04B 35/622* (2006.01)
  *C01B 32/162* (2017.01)
  *C01B 32/168* (2017.01)

(52) U.S. Cl.
  CPC .......... *C01B 32/162* (2017.08); *C01B 32/168* (2017.08); *C04B 35/52* (2013.01); *C04B 35/62222* (2013.01); *C01B 2202/02* (2013.01); *C01B 2202/06* (2013.01); *C01B 2202/08* (2013.01); *C01B 2202/34* (2013.01); *C01B 2202/36* (2013.01); *Y10S 977/75* (2013.01); *Y10S 977/752* (2013.01); *Y10S 977/843* (2013.01); *Y10T 428/26* (2015.01)

(56) References Cited

OTHER PUBLICATIONS

Cheng, H.; Large-scale and low-cost synthesis of single-walled carbon nanotubes by the catalytic pyrolysis of hydrocarbons; Jun. 22, 1998; Applied Physics Letters; vol. 72 No. 25; pp. 3282-3284.*

Murakami, Y., and S. Maruyama, "Detachment of Vertically Aligned Single-Walled Carbon Nanotube Films From Substrates and Their Re-Attachment to Arbitrary Surfaces," Chemical Physics Letters 422:575-580, 2006.

Murakami, Y., et al., "Polarization Dependence of Resonant Raman Scattering From Vertically Aligned Single-Walled Carbon Nanotube Films," Physical Review B 71:085403-1-8, 2005.

Murakami, Y., et al., "Polarization Dependence of the Optical Absorption of Single-Walled Carbon Nanotubes," Physical Review Letters PRL 94:087402-1-4, 2005.

Cheng, H.M., "Large-Scale and Low-Cost Synthesis of Single-Walled Carbon Nanotubes by the Catalytic Pyrolysis of Hydrocarbons," Applied Physics Letters 82(25):3282-3284, Jun. 1998.

Eres, G., et al., "Molecular Beam-Controlled Nucleation and Growth of Vertically Aligned Single-Wall Carbon Nanotube Arrays," The Journal of Physical Chemistry B 109(35)16684-16694, 2005.

Fan, S., et al., "Self-Oriented Regular Arrays of Carbon Nanotubes and Their Field Emission Properties," Science 283:512-514, Jan. 1999.

Hata, K., et al., "Water-Assisted Highly Efficient Synthesis of Impurity-Free Single-Walled Carbon Nanotubes," Science 306:1362-1364, Nov. 2004.

Li, W.Z., et al., "Large-Scale Synthesis of Aligned Carbon Nanotubes," Science 274:1701-1703, Dec. 1996.

Murakami, Y., et al., "Growth of Vertically Aligned Single-Walled Carbon Nanotube Films on Quartz Substrates and Their Optical Anisotropy," Chemical Physics Letters 385:298-303, Feb. 2004.

Zhang, G. et al., "Ultra-High-Yield Growth of Vertical Single-Walled Carbon Nanotubes: Hidden Roles of Hydrogen and Oxygen," Proceedings of the National Academy of Sciences of the United States of America, 102(45):16141-16145, Nov. 2005.

Zhong, G., et al., "Low Temperature Synthesis of Extremely Dense and Vertically Aligned Single-Walled Carbon Nanotubes," Japanese Journal of Applied Physics 44(4A):1558-1561, Apr. 2005.

* cited by examiner

CARBON NANOTUBE FREESTANDING MEMBRANE, PROCESS FOR PRODUCTION OF THE SAME, COMPOSITES HAVING CARBON NANOTUBE MEMBRANES AND PROCESS FOR PRODUCTION THEREOF

CROSS REFERENCES TO RELATED APPLICATIONS

This application is a division of U.S. application Ser. No. 12/160,026, filed Apr. 1, 2009, which is the National Stage of International Application No. PCT/JP2007/050003, filed Jan. 4, 2007, the entire disclosures of which are hereby incorporated by reference herein.

TECHNICAL FIELD

The present invention relates to a carbon nanotube freestanding membrane consisting of vertically aligned carbon nanotubes, and a process for producing the same.

Further, the present invention relates to a composite comprising a substrate, which is independent of a material, and vertically aligned carbon nanotubes formed on the substrate, and a process for producing the same.

More, the present invention relates to a process for peeling off the vertically aligned carbon nanotubes formed on the substrate.

BACKGROUND ART

A method for synthesizing single-walled carbon nanotubes (hereinafter, may be merely abbreviated as "SWNTs") to a solid wall surface has been conventionally studied actively from interests of both basic and applied researches. The effectivity of a chemical vapor deposition process (CVD process) for forming SWNTs on a substrate has been verified in the early stages. The generation of SWNTs based on various CVD process has been conventionally reported. The formation of SWNTs on the substrate can be mainly classified into following items (a) to (c): (a) a synthesis of small-amount non-aligned SWNTs from catalyst pattern on a substrate; (b) a synthesis of a random SWNTs membrane on the whole surface of a substrate; and (c) an alignment synthesis of small-amount SWNTs along a substrate.

In addition to these classifications, attentions have been recently focused on a vertically aligned single-walled carbon nanotube membrane synthesized on the surface of a substrate as a new-type SWNT membrane. The predominancy of SWNTs in studying the basic characteristic of SWNTs has been recently shown (see Non-Patent Document 1 or 2). A more important point is that the form in which SWNTs are vertically aligned is expected to extend and enable various applications in the future.

Non-Patent Document 1: Y. Murakami et al. Phys. Rev. B71, 085403 (2005).
Non-Patent Document 2: Y. Murakami et al., Phys. Rev. Lett. 94, 087402 (2005).

DISCLOSURE OF THE INVENTION

However, realistic problems include the following points. First, a typical CVD is carried out at 700 to 900° C. However, almost all materials (soda glasses, plastics, integrated circuits) cannot withstand such a high temperature. Next, the catalytic growth of SWNTs has been limited on the surface of stable oxide supports ($SiO_2$, $Al_2O_3$, MgO). The generation of SWNTs on metals usually used such as Cr, Ti, Al, Cu, and Au was impossible as long as the inventors know (or from the trial experience of the inventors). Therefore, although there has been a need for a composite having a substrate and a vertically aligned SWNTs membrane on the substrate made of arbitrary material, the composite has not been provided yet.

Thus, an object of the present invention is to overcome the above-described problems.

That is, an object of the present invention is to provide a composite comprising a substrate and a vertically aligned carbon nanotube membrane formed on the substrate regardless of the material of the substrate, and/or a process for producing the same.

Further, other than or in addition to the above effects, an object of the present invention is to provide a carbon nanotube freestanding membrane having no substrate and/or a process for producing the same.

More, other than or in addition to the above effects, an object of the present invention is to provide a process for peeling off vertically aligned carbon nanotubes formed on a substrate from the substrate.

The present inventors found that a composite comprising a substrate and a vertically aligned carbon nanotube membrane formed on the substrate can be immersed in water wherein a temperature of the water is higher by 25° C. or more, preferably 30° C. or more, and more preferably 35° C. or more than a temperature of the composite to peel off the vertically aligned carbon nanotube membrane. Alternatively, the present inventors found that the peeled membrane can be restuck on various solid wall surfaces with the form of the vertical alignability of the membrane maintained.

Specifically, the present inventors found the following inventions:

<1> A freestanding membrane consisting of vertically aligned carbon nanotubes.

<2> In the above item <1>, the freestanding membrane may have a thickness ranging from 200 nm to 500 µm., preferably from 200 nm to 100 µm, more preferably from 200 nm to 50 µm, and most preferably from 400 nm to 30 µm.

<3> In the above item <1> or <2>, a ratio r/d of a diameter r of a circle to a thickness d of the freestanding membrane may be 10 or more, preferably 100 or more, more preferably 1000 or more, the circle being calculated for the freestanding membrane and having an area equivalent to that of the freestanding membrane.

<4> In any one of the above items <1> to <3>, the freestanding membrane may be free from silicon (Si), in particular, the freestanding membrane may have silicon (Si) of 1000 ppm or less, preferably 100 ppm or less, more preferably 10 ppm or less.

<5> In any one of the above items <1> to <4>, the freestanding membrane may be free from halogen, in particular, the freestanding membrane may have halogen of 100 ppm or less, preferably 10 ppm or less, more preferably 1 ppm or less.

<6> In the above item <5>, the halogen may be fluoride, and the freestanding membrane may have fluoride of 100 ppm or less, preferably 10 ppm or less, more preferably 1 ppm or less.

<7> In the above item <5> or <6>, the halogen may be chlorine, and the freestanding membrane may have chlorine of 100 ppm or less, preferably 10 ppm or less, more preferably 1 ppm or less.

<8> In any one of the above items <1> to <7>, when the vertically aligned carbon nanotubes are formed on a substrate and the carbon nanotubes are peeled off from the substrate to form the freestanding membrane, the form of the vertically aligned carbon nanotubes on the substrate may be substantially the same as the form of the vertically aligned carbon nanotubes in the freestanding membrane.

<9> In any one of the above items <1> to <8>, the carbon nanotubes may be multi-walled carbon nanotubes and/or single-walled carbon nanotubes.

<10> In any one of the above items <1> to <8>, the carbon nanotubes may be single-walled carbon nanotubes, in particular may consist of single-walled carbon nanotubes.

<11> A process for producing a freestanding membrane consisting of vertically aligned carbon nanotubes, comprising the steps of:

(a) preparing a composite comprising a substrate and vertically aligned carbon nanotubes formed on the substrate; and (b) immersing the composite in water wherein a temperature ($T_w$) of the water is higher than a temperature ($T_c$) of the composite with a temperature difference $\Delta T$ ($=T_w-T_c$) between the temperature ($T_w$) and the temperature ($T_c$) being 25° C. or more, preferably 30° C. or more, more preferably 35° C. or more, to peel off the vertically aligned carbon nanotubes from the composite to obtain the freestanding membrane.

<12> In the above item <11>, the step (b) may comprise the step of forming the freestanding membrane so that the freestanding membrane is partially supported by a support member.

<13> In the above item <11> or <12>, the freestanding membrane may have a thickness ranging from 200 nm to 500 μm., preferably from 200 nm to 100 μm, more preferably from 200 nm to 50 μm, and most preferably from 400 nm to 30 μm.

<14> In any one of the above items <11> to <13>, a ratio r/d of a diameter r of a circle to a thickness d of the freestanding membrane may be 10 or more, preferably 100 or more, more preferably 1000 or more, the circle being calculated for the freestanding membrane and having an area equivalent to that of the freestanding membrane.

<15> In any one of the above items <11> to <14>, the form, in particular the vertical alignability, of the vertically aligned carbon nanotubes in the freestanding membrane may substantially maintain the form, in particular the vertical alignability, of the vertically aligned carbon nanotubes in the composite.

<16> In any one of the above items <11> to <15>, the freestanding membrane may be free from silicon (Si), in particular, the freestanding membrane may have silicon (Si) of 1000 ppm or less, preferably 100 ppm or less, more preferably 10 ppm or less.

<17> In any one of the above items <11> to <16>, the vertically aligned carbon nanotubes may be free from halogen, in particular, the vertically aligned carbon nanotubes may have halogen of 100 ppm or less, preferably 10 ppm or less, more preferably 1 ppm or less.

<18> In the above item <17>, the halogen may be fluoride, and the vertically aligned carbon nanotubes may have fluoride of 100 ppm or less, preferably 10 ppm or less, more preferably 1 ppm or less.

<19> In the above item <17> or <18>, the halogen may be chlorine, and the vertically aligned carbon nanotubes may have chlorine of 100 ppm or less, preferably 10 ppm or less, more preferably 1 ppm or less.

<20> In any one of the above items <11> to <19>, the carbon nanotubes may be multi-walled carbon nanotubes and/or single-walled carbon nanotubes.

<21> In any one of the above items <11> to <20>, the carbon nanotubes may be single-walled carbon nanotubes, in particular may consist of single-walled carbon nanotubes.

<22> A process for peeling off vertically aligned carbon nanotubes from a substrate, comprising the steps of:

(a) preparing a composite comprising the substrate and the vertically aligned carbon nanotubes formed on the substrate; and (b) immersing the composite in water wherein a temperature ($T_w$) of the water is higher than a temperature ($T_c$) of the composite with a temperature difference $\Delta T$ ($=T_w-T_c$) between the temperature ($T_w$) and the temperature ($T_c$) being 25° C. or more, preferably 30° C. or more, more preferably 35° C. or more, to peel off the carbon nanotubes from the composite.

<23> In the above item <22>, the vertically aligned carbon nanotubes obtained by the step b), i.e., the peeled, vertically aligned carbon nanotubes may have a thickness ranging from 200 nm to 500 μm., preferably from 200 nm to 100 μm, more preferably from 200 nm to 50 μm, and most preferably from 400 nm to 30 μm.

<24> In the above item <22> or <23>, the form of the vertically aligned carbon nanotubes obtained by the step b), i.e., the peeled, vertically aligned carbon nanotubes may substantially maintain the form of the vertically aligned carbon nanotubes in the composite. Further, the membrane of the vertically aligned carbon nanotubes may have an area of 10 millimeters square or more, preferably 20 millimeters square or more, and more preferably 50 millimeters square or more.

<25> In any one of the above items <22> to <24>, the vertically aligned carbon nanotubes obtained by the step b), i.e., the peeled, vertically aligned carbon nanotubes, in particular the vertical alignability, may substantially maintain the form, in particular the vertical alignability, of the vertically aligned carbon nanotubes in the composite.

<26> In any one of the above items <22> to <24>, the vertically aligned carbon nanotubes obtained by the step b), i.e., the peeled, vertically aligned carbon nanotubes may be free from silicon (Si), in particular, the peeled, vertically aligned carbon nanotubes may have silicon (Si) of 1000 ppm or less, preferably 100 ppm or less, more preferably 10 ppm or less.

<27> In any one of the above items <22> to <26>, the vertically aligned carbon nanotubes obtained by the step b), i.e., the peeled, vertically aligned carbon nanotubes may be free from halogen, in particular, the peeled, vertically aligned carbon nanotubes may have halogen of 100 ppm or less, preferably 10 ppm or less, more preferably 1 ppm or less.

<28> In the above item <27>, the halogen may be fluoride, and the vertically aligned carbon nanotubes obtained by the step b), i.e., the peeled, vertically aligned carbon nanotubes may have fluoride of 100 ppm or less, preferably 10 ppm or less, more preferably 1 ppm or less.

<29> In the above item <27> or <28>, the halogen may be chlorine, and the vertically aligned carbon nanotubes obtained by the step b), i.e., the peeled, vertically aligned carbon nanotubes may have chlorine of 100 ppm or less, preferably 10 ppm or less, more preferably 1 ppm or less.

<30> In any one of the above items <22> to <29>, the carbon nanotubes may be multi-walled carbon nanotubes and/or single-walled carbon nanotubes.

<31> In any one of the above items <11> to <20>, the carbon nanotubes may be single-walled carbon nanotubes, in particular may consist of single-walled carbon nanotubes.

<32> A freestanding membrane consisting of the vertically aligned carbon nanotubes, obtained by the process described in any one of the above items <22> to <31>.

<33> A first composite comprising a first substrate (excluding quartz or silicon) and vertically aligned carbon nanotubes formed on the first substrate. In particular, the vertically aligned carbon nanotubes may be formed directly on the first substrate.

<34> In the above item <33>, the vertically aligned carbon nanotubes may have a thickness ranging from 200 nm to 500 μm., preferably from 200 nm to 100 μm, more preferably from 200 nm to 50 μm, and most preferably from 400 nm to 30 μm.

<35> In the above item <33> or <34>, the vertically aligned carbon nanotubes may have an area of 10 millimeters square or more, preferably 20 millimeters square or more, and more preferably 50 millimeters square or more.

<36> In any one of the above items <33> to <35>, when the vertically aligned carbon nanotubes are formed on a second substrate, and are peeled off from the second substrate to form the first composite, the form of the vertically aligned carbon nanotubes in the first composite may be substantially the same as the form of the vertically aligned carbon nanotubes on the second substrate.

<37> In any one of the above items <33> to <36>, the vertically aligned carbon nanotubes may be free from silicon (Si), in particular, the vertically aligned carbon nanotubes may have silicon (Si) of 1000 ppm or less, preferably 100 ppm or less, more preferably 10 ppm or less.

<38> In any one of the above items <33> to <37>, the vertically aligned carbon nanotubes may be free from halogen, in particular, the vertically aligned carbon nanotubes may have halogen of 100 ppm or less, preferably 10 ppm or less, more preferably 1 ppm or less.

<39> In the above item <38>, the halogen may be fluoride, and the vertically aligned carbon nanotubes may have fluoride of 100 ppm or less, preferably 10 ppm or less, more preferably 1 ppm or less.

<40> In the above item <38> or <39>, the halogen may be chlorine, and the vertically aligned carbon nanotubes may have chlorine of 100 ppm or less, preferably 10 ppm or less, more preferably 1 ppm or less.

<41> In any one of the above items <33> to <40>, the carbon nanotubes may be multi-walled carbon nanotubes and/or single-walled carbon nanotubes.

<42> In any one of the above items <33> to <40>, the carbon nanotubes may be single-walled carbon nanotubes, in particular may consist of single-walled carbon nanotubes.

<43> A process for producing a first composite comprising a first substrate and vertically aligned carbon nanotubes formed on the first substrate, comprising the steps of:

(a) preparing a second composite comprising a second substrate made of quartz or silicon and vertically aligned carbon nanotubes formed on the second substrate;

(b) immersing the second composite in water wherein a temperature ($T_w$) of the water is higher than a temperature ($T_c$) of the second composite with a temperature difference $\Delta T$ ($=T_w-T_c$) between the temperature ($T_w$) and the temperature ($T_c$) being 25° C. or more, preferably 30° C. or more, more preferably 35° C. or more, to peel off the vertically aligned carbon nanotubes from the second substrate, and arranging the vertically aligned carbon nanotubes in the water or on the surface of the water; and (c) placing the peeled, vertically aligned carbon nanotubes on the first substrate to form the vertically aligned carbon nanotubes on the first substrate.

In particular, the vertically aligned carbon nanotubes may be formed directly on the first substrate.

<44> In the above item <43>, the first substrate may be made of a material excluding a material consisting of quartz or a material consisting of silicon.

<45> In the above item <43> or <44>, the form, in particular the vertical alignability of the vertically aligned carbon nanotubes in the first composite may substantially maintain the form, in particular the vertical alignability of the vertically aligned carbon nanotubes in the second composite.

<46> In any one of the above items <43> to <45>, the vertically aligned carbon nanotubes in the first composite may have a thickness ranging from 200 nm to 500 μm., preferably from 200 nm to 100 μm, more preferably from 200 nm to 50 μm, and most preferably from 400 nm to 30 μm.

<47> In any one of the above items <43> to <46>, the vertically aligned carbon nanotubes in the first composite may have an area of 10 millimeters square or more, preferably 20 millimeters square or more, and more preferably 50 millimeters square or more.

<48> In any one of the above items <43> to <47>, the vertically aligned carbon nanotubes formed on the first substrate may be free from silicon (Si), in particular, the vertically aligned carbon nanotubes formed on the first substrate may have silicon (Si) of 1000 ppm or less, preferably 100 ppm or less, more preferably 10 ppm or less.

<49> In any one of the above items <43> to <48>, the vertically aligned carbon nanotubes formed on the first substrate may be free from halogen, in particular, the vertically aligned carbon nanotubes formed on the first substrate may have halogen of 100 ppm or less, preferably 10 ppm or less, more preferably 1 ppm or less.

<50> In the above item <49>, the halogen may be fluoride, and the vertically aligned carbon nanotubes formed on the first substrate may have fluoride of 100 ppm or less, preferably 10 ppm or less, more preferably 1 ppm or less.

<51> In the above item <49> or <50>, the halogen may be chlorine, and the vertically aligned carbon nanotubes formed on the first substrate may have chlorine of 100 ppm or less, preferably 10 ppm or less, more preferably 1 ppm or less.

<52> In any one of the above items <43> to <51>, the carbon nanotubes may be multi-walled carbon nanotubes and/or single-walled carbon nanotubes.

<53> In any one of the above items <43> to <51>, the carbon nanotubes may be single-walled carbon nanotubes, in particular may consist of single-walled carbon nanotubes.

<54> A composite obtained by the process described in any one of the above items <43> to <53>, and the composite may comprise a first substrate; and vertically aligned carbon nanotubes formed on the first substrate.

EFFECT OF THE INVENTION

The present invention can provide a composite comprising a substrate and a vertically aligned carbon nanotube membrane formed on the substrate regardless of the material of the substrate, and/or a process for producing the same.

Further, other than or in addition to the above effect, the present invention can provide a carbon nanotube freestanding membrane having no substrate and/or a process for producing the same.

More, other than or in addition to the above effects, the present invention can provide a process for peeling off vertically aligned carbon nanotubes formed on a substrate from the substrate.

BEST MODE FOR CARRYING OUT THE INVENTION

Figure 1:
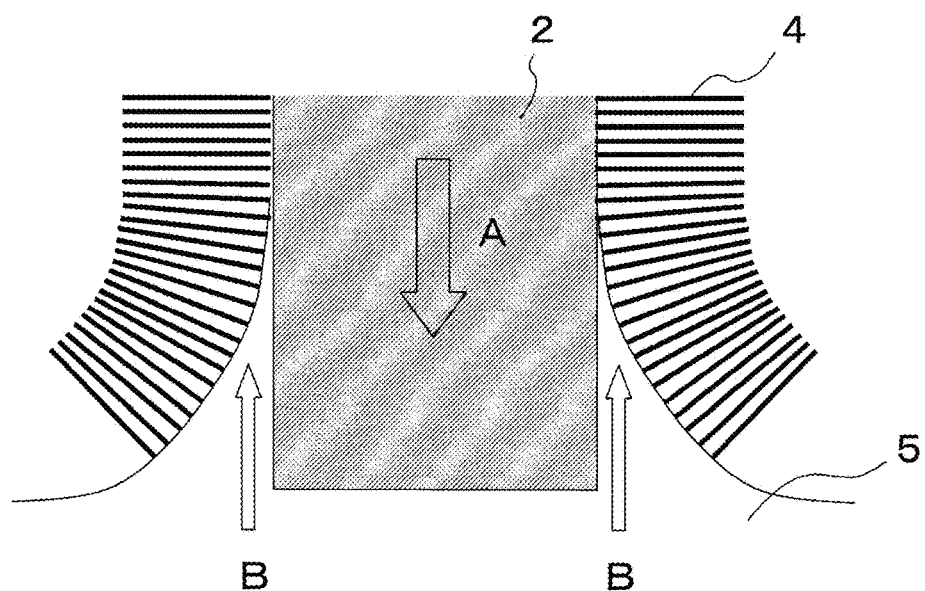
FIG. 1 is a schematic view showing a peel-off mechanism of a vertically aligned carbon nanotube membrane according to the present invention.

As described above, the present inventors have found a technique for peeling off a vertically aligned carbon nanotube membrane formed on a substrate and a technique for sticking the peeled membrane onto various solid wall surfaces, to find the various inventions.

Hereinafter, these inventions will be described in detail.
<Process for Peeling Off Vertically Aligned Carbon Nanotubes from Substrate>

The present application provides a process for peeling off vertically aligned carbon nanotubes from a substrate.

This process comprises the steps of:

(a) preparing a composite having a substrate and vertically aligned carbon nanotubes formed on the substrate; and (b) immersing the composite in water wherein a temperature ($T_w$) of the water is higher than a temperature ($T_c$) of the composite with a temperature difference $\Delta T$ ($=T_w-T_c$) between the temperature ($T_w$) and the temperature ($T_c$) being 25° C. or more, preferably 30° C. or more, and more preferably 35° C. or more.

Thus, the vertically aligned carbon nanotubes can be peeled off from the composite by immersing the composite in the water having a predetermined temperature.

The above step (a), i.e., the step of preparing the composite can use conventional and future processes for providing a vertically aligned carbon nanotubes on a substrate. For example, the composite can be obtained by techniques described in, for example, Y. Murakami, et al., Chem. Phys. Lett. 385, 298 (2004), whole of which is incorporated herein by reference, Y. Murakami, et al., Carbon 43, 2664 (2005), whole of which is incorporated herein by reference, or S. Maruyama, et al., Chem. Phys. Lett. 403 (2005) 320, whole of which is incorporated herein by reference, which is based on the present inventors (or the inventors who are a part of the present inventors).

As described above, a material capable of withstanding a high temperature (700 to 900° C.) is used as the substrate used for the composite herein. The substrates used in the existing processes are made of quartz (including synthetic quartz) and silicon. The present inventors consider that inorganic oxides such as $SiO_2$ and metal oxide crystals such as $Al_2O_3$ and MgO can be theoretically used as the substrate besides quartz or silicon.

Then, the process of the present invention is subject to the step (b), i.e., the step of immersing the composite in the water.

Herein, the water is preferably pure water, or water equivalent to the pure water, for example, distilled water and ion exchange water. However, the water is not limited thereto. For example, the step (b) can be carried out by using water partially containing impurities such as tap water. However, the pure water or the water equivalent to the pure water is preferably used in view of the application of a freestanding membrane or composite subsequently obtained to various products as described later.

The composite and the water in which the composite is immersed have the following temperature condition. That is, the temperature ($T_w$) of the water is necessary to be higher than the temperature ($T_c$) of the composite with a temperature difference $\Delta T$ ($=T_w-T_c$) between the temperature ($T_w$) and the temperature ($T_c$) being 25° C. or more. The temperature difference $\Delta T$ is preferably 30° C. or more, and more preferably 35° C. or more. For example, if the temperature of the composite is a room temperature (23° C.), the temperature of the water is necessary to be 48° C. or more. When the temperature of the composite is maintained at −15° C., the temperature of the water is necessary to be 10° C. or more.

Thus, the vertically aligned carbon nanotubes can be peeled off from the composite by immersing the composite in the water under the temperature condition. The peeled, vertically aligned carbon nanotubes exist almost on the surface of the water while maintaining the form of the vertically aligned carbon nanotubes in the composite, in particular the vertical alignability.

The mechanism in which the vertically aligned carbon nanotubes are peeled off from the composite is not completely understood. However, the present inventors possibly consider that the mechanism is based on compression caused by thermal stress and a difference between expansion coefficients. The other possible factors may include: A phenomenon has been studied for a long time, wherein warm liquid located below is driven on a cold surface of a substrate having a lower part perpendicularly immersed in a bath of the warm liquid by surface tension inclination along a gas-liquid interface induced by the temperature difference, and moves upward against gravity (for example, see V. Ludviksson and E. N. Lightfoot, AIChE J. 17, 1166 (1971), P. Carles and A. M. Cazabat, J. Coll. Interf. Sci. 157, 196 (1993). The phenomenon is referred to as thermocapillary force. Since a quartz surface is wetted with water (0<contact angle θ<90°) in the present invention and there is a large temperature difference ($\Delta T \geq 25°$ C.) between a sample substrate and warm water, the present inventors consider that the warm water is moved upward on the surface of the sample substrate by the thermocapillary phenomenon. However, simultaneously, since the vertically aligned carbon nanotube membrane has super-water repellency (θ=160°) (see H. Li et al., Angew. Chem. 113, 1793 (2001)), the present inventors consider that a liquid membrane of water moving upward on the surface of the sample substrate applies strong repelling force to the vertically aligned carbon nanotube membrane to float the membrane from the substrate.

Herein, FIG. 1 schematically shows a proposal for the above peel-off mechanism of the membrane. FIG. 1 schematically shows a condition where a membrane of vertically aligned carbon nanotubes 4 is gradually peeled off from a substrate 2 when a composite in which the vertically aligned carbon nanotubes 4 are formed on the substrate 2 is immersed along a direction "A" in warm water 5. As described above, the present inventors consider that when the composite is immersed in the direction "A", the warm water moves upward in a direction "B", i.e., on the surface of the substrate, and applies strong repelling force to float the membrane of the vertically aligned carbon nanotubes 4 from the substrate to ultimately peel off the membrane of the vertically aligned carbon nanotubes 4 from the substrate 2.

In the process of the present invention, as long as the vertically aligned carbon nanotubes formed on the substrate of the composite to be used have vertical alignability, the shape and kind thereof are not limited. That is, the carbon nanotubes may be single-walled carbon nanotubes, multi-walled carbon nanotubes or a mixture thereof. The vertically aligned carbon nanotubes may have two-dimensional area or be one-dimensionally formed linearly.

Since the process of the present invention can be carried out under a condition having no burden on the environment as described above, the vertically aligned carbon nanotubes existing almost on the surface of the water obtained by the step (b) may maintain the form and condition before being peeled off. That is, the peeled, vertically aligned carbon nanotubes contain only impurities contained in the composite before being peeled off. For example, the peeled, vertically aligned carbon nanotubes may be free from silicon (Si). In particular, the vertically aligned carbon nanotubes may have silicon (Si) of 1000 ppm or less, preferably 100 ppm or less, and more preferably 10 ppm or less. The vertically aligned carbon nanotubes, which may be free from halogen, in particular, may have halogen of 100 ppm or less, preferably 10 ppm or less, and more preferably 1 ppm or less. When the halogen is fluoride, the vertically aligned carbon nanotubes may have fluoride of 100 ppm or less, preferably 10 ppm or less, and more preferably 1 ppm or less. When the halogen is chlorine, the vertically aligned carbon nanotubes may have chlorine of 100 ppm or less, preferably 10 ppm or less, and more preferably 1 ppm or less.

The vertically aligned carbon nanotubes obtained by above step (b), i.e., the peeled, vertically aligned carbon nanotubes may have a thickness ranging from 200 nm to 500 µm, preferably from 200 nm to 100 µm, more preferably from 200 nm to 50 µm, and most preferably from 400 nm to 30 µm.

A ratio r/d of a diameter r of a circle to a thickness d of the membrane of the peeled, vertically aligned carbon nanotubes may be 10 or more, preferably 100 or more, and more preferably 1000 or more, wherein the circle has an area equivalent to that of the membrane of the vertically aligned carbon nanotubes. The area of the membrane may be 10 millimeters square or more, preferably 20 millimeters square or more, and more preferably 50 millimeters square or more.

The phrase "the circle being (is) calculated for the membrane of the vertically aligned carbon nanotubes and having the area equivalent to that of the membrane of the vertically aligned carbon nanotubes" used herein means a circle obtained by calculating the area of the membrane to the circle geometrically equivalent to the area.

In the present invention, a circle having a diameter larger than the thickness of the membrane, more specifically, a large area membrane can be peeled off.

Further, as described above, the form, in particular the vertical alignability, of the peeled, vertically aligned carbon nanotubes can substantially maintain the form, in particular the vertical alignability, of the vertically aligned carbon nanotubes in the composite. Whether the form, in particular the vertical alignability, of the vertically aligned carbon nanotubes is maintained in a condition before being peeled off can be determined by SEM images before and after being peeled off, and/or can be determined by Raman spectroscopic analysis results. The SEM image is a conventional means upon observing the carbon nanotubes, and the detail thereof is omitted herein. By contrast, the Raman spectroscopic analysis will be described hereinafter.

Techniques for confirming whether high quality carbon nanotubes, in particular single-walled carbon nanotubes, in particular vertically aligned single-walled carbon nanotubes are obtained by using the Raman spectroscopic analysis are described in Y. Murakami et al. Carbon 43, 2664 (2005) and Y. Murakami et al. Phys. Rev. B71, 085403 (2005), both of whole of which are incorporated herein by reference.

Specifically, when a Raman scattering spectrum is observed using light having a wavelength of 488 nm, a peak referred to as G-band of the carbon nanotube itself is present in the vicinity of 1593 $cm^{-1}$, and a peak of D-band caused by the existence of defect in the vicinity of 1340 $cm^{-1}$ is sufficiently smaller than the peak of the G-band, confirming that the high quality single-walled carbon nanotubes are obtained.

When light having a wavelength of 488 nm is measured by the incidence in the normal line direction of the substrate, the maximum peak is present in the vicinity of 180 $cm^{-1}$ in the spectrum of the radial breathing mode (RBM) of the single-walled carbon nanotubes, confirming that the single-walled carbon nanotubes are vertically aligned.

Briefly, the peak of the G-band is large in the Raman scattering spectrum; the peak of D-band is sufficiently smaller than the peak of G-band; the maximum peak is observed in the vicinity of 180 $cm^{-1}$ in the RBM; and further, no change or poor change thereof before and after being peeled off is observed, confirming that the form, in particular the vertical alignability, of the vertically aligned carbon nanotubes maintains the condition before being peeled off.

<Freestanding Membrane Consisting of Vertically Aligned Carbon Nanotubes and Process for Producing the Same>

The present application can provide the freestanding membrane consisting of the vertically aligned carbon nanotubes and the process for producing the same by using the above-described peel-off process. First, the process for producing the freestanding membrane will be described hereinafter.

The freestanding membrane is obtained by using the above peel-off process. Specifically, the freestanding membrane can be obtained by taking up the vertically aligned carbon nanotubes, obtained by the peel-off process, existing almost on the surface of the water. More specifically, the freestanding membrane can be obtained by taking up the vertically aligned carbon nanotubes existing almost on the surface of the water by using a support member and partially supporting the vertically aligned carbon nanotubes by using the support member. The resulting freestanding membrane may be applied to a drying process at request.

As long as the support member can take up the vertically aligned carbon nanotubes existing almost on the surface of the water, the characteristic and/or shape of the support member are/is not limited. Therefore, the support member may have a ring shape or a ring shape lacking a part of the ring shape, that is, a "C" shape. Alternatively, the support member may have a rod shape. Further, the support member may be a plate-like member having one or a plurality of penetrating holes or a member in which a plurality of penetrating holes such as mesh are continuously arranged. The support member may be removed from the freestanding membrane; or may be used with the freestanding membrane, depending on the subsequent application of the freestanding membrane and/or on the characteristic of the support member.

Since the process for producing the freestanding membrane uses the above peel-off process, the composite, the vertically aligned carbon nanotubes and the water or the like which are same as those of the above description can be used. The resulting freestanding membrane may have the characteristic of the vertically aligned carbon nanotubes peeled by the above peel-off process.

As described above, the present application can provide the freestanding membrane consisting of the vertically aligned carbon nanotubes. The phrase "consisting of the vertically aligned carbon nanotubes" used herein means that the freestanding membrane contains no substance except the vertically aligned carbon nanotubes according to the words. As compared with the above-described term "composite", the "freestanding membrane" does not comprise the "substrate" of the "composite".

As described above, it is preferable that the freestanding membrane of the present invention contains no impurities except "the vertically aligned carbon nanotubes".

In particular, it is preferable that the freestanding membrane of the present invention may be free from silicon (Si). In particular, the freestanding membrane may have silicon (Si) of 1000 ppm or less, preferably 100 ppm or less, and more preferably 10 ppm or less.

It is preferable that the freestanding membrane may be free from halogen. In particular, the freestanding membrane may have halogen of 100 ppm or less, preferably 10 ppm or less, and more preferably 1 ppm or less. In particular, when the halogen is fluoride, the freestanding membrane may have fluoride of 100 ppm or less, preferably 10 ppm or less, and more preferably 1 ppm or less.

When the halogen is chlorine, the freestanding membrane may have chlorine of 100 ppm or less, preferably 10 ppm or less, and more preferably 1 ppm or less.

The freestanding membrane of the present invention may have a thickness ranging from 200 nm to 500 μm, preferably from 200 nm to 100 μm, more preferably from 200 nm to 50 μm, and most preferably from 400 nm to 30 μm.

A ratio r/d of a diameter r of a circle to a thickness d of the freestanding membrane is 10 or more, preferably 100 or more, and more preferably 1000 or more, the circle having the area equivalent to that of the freestanding membrane.

Herein, "the circle having the area equivalent to that of the freestanding membrane" means a circle obtained by calculating the area of the membrane to the circle geometrically equivalent to the area.

The form, in particular the vertical alignability, of the vertically aligned carbon nanotubes in the freestanding membrane according to the present invention can substantially maintain the form, in particular the vertical alignability, of the vertically aligned carbon nanotubes in the composite.

As long as the carbon nanotubes have vertical alignability in the freestanding membrane, the kind thereof is not limited. The carbon nanotubes may be single-walled carbon nanotubes, multi-walled carbon nanotubes or a mixture thereof.

<Composite and Process for Producing the Same>

The present application further provides a composite having a substrate and vertically aligned carbon nanotubes formed on the substrate, and a process for producing the same. That is, the present invention can provide the composite which is independent of the characteristic of the substrate unlike a conventional composite.

Specifically, the composite of the present invention comprises the substrate (excluding quartz or silicon) and the vertically aligned carbon nanotubes formed on the substrate.

The phrase "excluding quartz or silicon" used herein means that substrates used for the existing processes are eliminated. The "quartz" also includes synthetic quartz. Although these substrates can be used for the composite of the present invention, the composite can be provided by using other substrates. In the existing processes, metal oxides such as $Al_2O_3$ and MgO and inorganic oxide crystals such as $SiO_2$ can be used for the substrate in addition to quartz or silicon. Although the present invention can provide the composite using the substrate which can be used for these existing processes, the present invention can also provide the composites which use other substrates.

The composite of the present invention may have an adhesive layer interposed between the substrate and the vertically aligned carbon nanotubes. However, the composite may have no adhesive layer. That is, the vertically aligned carbon nanotubes can be formed immediately above the substrate.

The composite of the present invention also has the following feature.

That is, the composite or vertically aligned carbon nanotubes of the present invention, which may be free from silicon (Si), in particular may have silicon (Si) of 1000 ppm or less, preferably 100 ppm or less, and more preferably 10 ppm or less. The composite or vertically aligned carbon nanotubes of the present invention, which may be free from halogen, in particular may have halogen of 100 ppm or less, preferably 10 ppm or less, and more preferably 1 ppm or less. When the halogen is fluoride, the composite or vertically aligned carbon nanotubes of the present invention may have fluoride of 100 ppm or less, preferably 10 ppm or less, and more preferably 1 ppm or less. When the halogen is chlorine, the composite or vertically aligned carbon nanotubes according to the present invention may have chlorine of 100 ppm or less, preferably 10 ppm or less, and more preferably 1 ppm or less.

As long as the carbon nanotubes have vertical alignability in the composite of the present invention, the kind thereof is not particularly limited. The carbon nanotubes may be single-walled carbon nanotubes, multi-walled carbon nanotubes, or a mixture thereof.

In the composite of the present invention, the vertically aligned carbon nanotubes may have a thickness ranging from 200 nm to 500 μm, preferably from 200 nm to 100 μm, more preferably from 200 nm to 50 μm, and most preferably from 400 nm to 30 μm.

In the composite of the present invention, the membrane of the vertically aligned carbon nanotubes may have an area of 10 millimeters square or more, preferably 20 millimeters square or more, and more preferably 50 millimeters square or more.

Further, as described above, the form, in particular the vertical alignability, of the vertically aligned carbon nanotubes in a first composite of the present invention can substantially maintain the form, in particular the vertical alignability, of the vertically aligned carbon nanotubes in a second composite. Whether the form, in particular the vertical alignability, of the vertically aligned carbon nanotubes is maintained in a condition before being peeled off can be determined by SEM images before and after being peeled off, and/or can be determined by Raman spectroscopic analysis results.

The composite of the present invention, i.e., the first composite comprising a first substrate and vertically aligned carbon nanotubes formed on the first substrate can be prepared as follows:

The first composite can be prepared by a process comprising the steps of:

(a) preparing a second composite comprising a second substrate made of quartz or silicon and vertically aligned carbon nanotubes formed on the second substrate;

(b) immersing the second composite in water wherein a temperature ($T_w$) of the water is higher than a temperature ($T_c$) of the second composite with a temperature difference $\Delta T$ ($=T_w-T_c$) between the temperature ($T_w$) and the temperature ($T_c$) being 25° C. or more, preferably 30° C. or more, and more preferably 35° C. or more, to peel off the vertically aligned carbon nanotubes from the second substrate and arrange them either in water or on the surface thereof; and (c) placing the peeled, vertically aligned carbon nanotubes on the first substrate, wherein the vertically aligned carbon nanotubes are formed on the first substrate. The vertically aligned carbon nanotubes can be formed immediately above the substrate as described above.

The first substrate is not particularly limited in the process for producing the first composite of the present invention. However, in order to obtain the composite of the present invention described above, the first substrate is preferably made of a material except a material consisting of quartz or silicon.

In the process for producing the first composite of the present invention, the steps (a) and (b) are the same as the above "peel-off process" or the "process for producing the freestanding membrane". Therefore, the detailed description thereof is omitted.

The process for producing the first composite of the present invention is applied to the step (c) of placing the peeled, vertically aligned carbon nanotubes on the first substrate after the step (b).

Specifically, the peeled, vertically aligned carbon nanotubes can be placed on the first substrate as follows. The peeled, vertically aligned carbon nanotubes exist in the vicinity of the water surface so that the vertical alignment direction is made vertical to the water surface. The first substrate is immersed in the water in which the vertically aligned carbon nanotubes exist at various angles so that the first substrate is brought into contact with the vertically aligned carbon nanotubes. For example, (i) the first substrate may be immersed in the water so that the vertically aligned carbon nanotubes are scooped by the first substrate and be then pulled up from the water to place the vertically aligned carbon nanotubes on the first substrate. Alternatively, (ii) the first substrate may be immersed in the water surface so as to form a LB membrane, and be then pulled up. That is, the first substrate may be immersed in the water so that a surface of the first substrate on which the vertically aligned carbon nanotubes are formed is almost made vertical to the water surface and is brought into contact with the vertically aligned carbon nanotubes existing in the vicinity of the water surface, and be then pulled up to place the vertically aligned carbon nanotubes on the first substrate. Further, (iii) the formation surface of the first substrate may be substantially in parallel to the water surface and be brought into contact with the vertically aligned carbon nanotubes existing in the vicinity of the water surface to place the vertically aligned carbon nanotubes on the first substrate.

Thus, the vertical alignability of the vertically aligned carbon nanotubes in the first composite can be made substantially the same as that of the vertically aligned carbon nanotubes in the second composite by placing the vertically aligned carbon nanotubes on the first substrate. In the case of the above item (iii), the vertical alignability of the vertically aligned carbon nanotubes in the first composite is in an overturning condition to that of the vertically aligned carbon nanotubes in the second composite.

The first composite of the present invention also has the same feature as that of the above freestanding membrane. That is, the composite or vertically aligned carbon nanotubes of the present invention, which may be free from silicon (Si), in particular may have silicon (Si) of 1000 ppm or less, preferably 100 ppm or less, and more preferably 10 ppm or less. The composite or vertically aligned carbon nanotubes of the present invention, which may be free from halogen, in particular may have halogen of 100 ppm or less, preferably 10 ppm or less, and more preferably 1 ppm or less. When the halogen is fluoride, the composite or vertically aligned carbon nanotubes of the present invention may have fluoride of 100 ppm or less, preferably 10 ppm or less, and more preferably 1 ppm or less. When the halogen is chlorine, the composite or vertically aligned carbon nanotubes of the present invention may have chlorine of 100 ppm or less, preferably 10 ppm or less, and more preferably 1 ppm or less.

As long as the carbon nanotubes of the composite of the present invention has vertical alignability, the kind thereof is not particularly limited, and the carbon nanotubes may be single-walled carbon nanotubes, multi-walled carbon nanotubes or a mixture thereof.

The application of the freestanding membrane according to the present invention to various products is expected. The freestanding membrane according to the present invention can be used for, for example, various optical elements (for example, light polarizers, light filters, nonlinear optical materials and saturable absorption elements or the like), various sensors (chemical sensors), large capacity transistors, field-emission electrodes, fuel cell materials (for example, fuel cell electrodes), solar cell materials, transparent electrodes, various composite materials (for example, composite materials having a thermal strength and/or a mechanical strength, and substrates for these materials or the like), actuators, and biological functionalizing materials (for example, antithrombogenic materials) or the like.

The application of the composite according to the present invention to various products is expected as well as that of the freestanding membrane. The composite of the present invention depends on the characteristic of the substrate. For example, various applications may include various optical elements (for example, light polarizers, light filters, nonlinear optical materials and saturable absorption elements or the like), various sensors (chemical sensors), large capacity transistors, field-emission electrodes, fuel cell materials (for example, fuel cell electrodes), solar cell materials, transparent electrodes, various composite materials (for example, composite materials having a thermal strength and/or a mechanical strength, and substrates for these materials or the like), actuators, and biological functionalizing materials (for example, antithrombogenic materials).

Hereinafter, the present invention will be further described in detail with reference to Examples, but is not limited thereto.

EXAMPLE 1

<Preparation of Composite Having Vertically Aligned Single-walled Carbon Nanotubes>

A composite A having vertically aligned single-walled carbon nanotubes was prepared by techniques described in Y. Murakami, et al., Chem. Phys. Lett. 385, 298 (2004), whole of which is incorporated herein by reference, or Y. Murakami, et al., Carbon 43, 2664(2005), whole of which is incorporated herein by reference.

Specifically, the vertically aligned single-walled carbon nanotubes were synthesized on a quartz substrate by using an alcoholic CVD process (see S. Maruyama, R. Kojima, Y. Miyauchi, S. Chiashi, and M. Kohno, Chem. Phys. Lett. 360, 229 (2002) or Y. Murakami, Y. Miyauchi, S. Chiashi, and S. Maruyama, Chem. Phys. Lett. 374, 53 (2003). Whole of these documents are incorporated herein by reference.) from a Co/Mo catalyst (see Y. Murakami, Y. Miyauchi, S. Chiashi, and S. Maruyama, Chem. Phys. Lett. 377, 49 (2003) or Y. Murakami, S. Chiashi, Y. Miyauchi, and S. Maruyama, Jpn. J. Appl. Phys. 43, 1221 (2004). Whole of these documents are incorporated herein by reference.) supported on both the surfaces of the quartz substrate having a thickness of 0.5 mm by dip coating.

Figure 2:
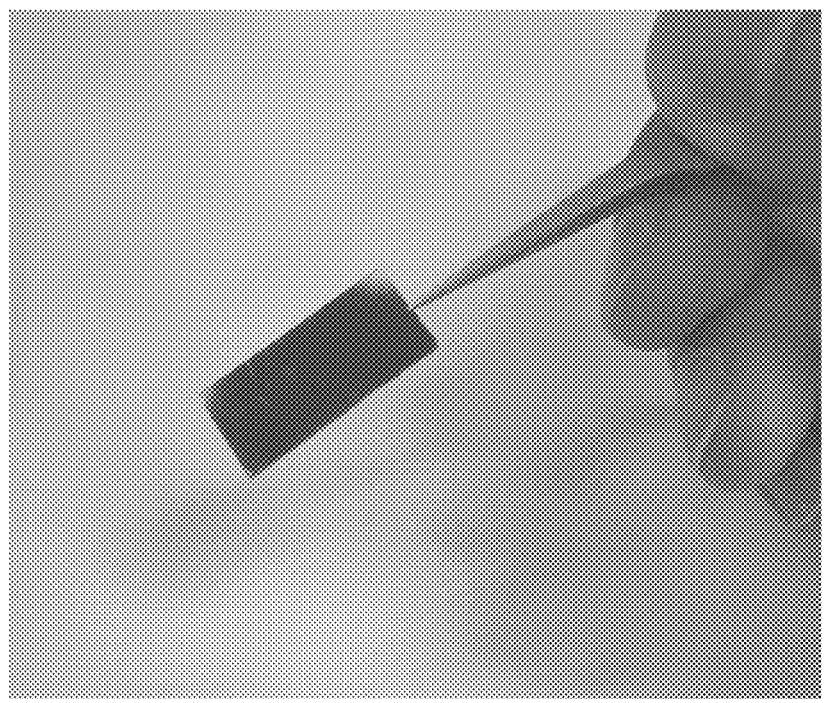
FIG. 2 shows a composite A (a composite before being peeled off) of Example 1.

FIG. 2 shows the appearance of the obtained composite A. An observation (not shown) by a transmission electron microscope (TEM) and an observation (see FIG. 3) by a field-emission scanning electron microscope (FE-SEM) confirmed that the diameters of SWNTs in a vertically aligned single-walled carbon nanotube membrane are distributed in a range of 0.8 nm to 3.0 nm (the average diameter of the SWNTs is about 2.0 nm), and a sample consists of high purity SWNTs and effectively contains no impurities, unlike multi-walled carbons and amorphous carbons. The thickness of the vertically aligned single-walled carbon nanotube membrane (or the height of the vertically aligned single-walled carbon nanotubes) was 10 μm.

Figure 4:
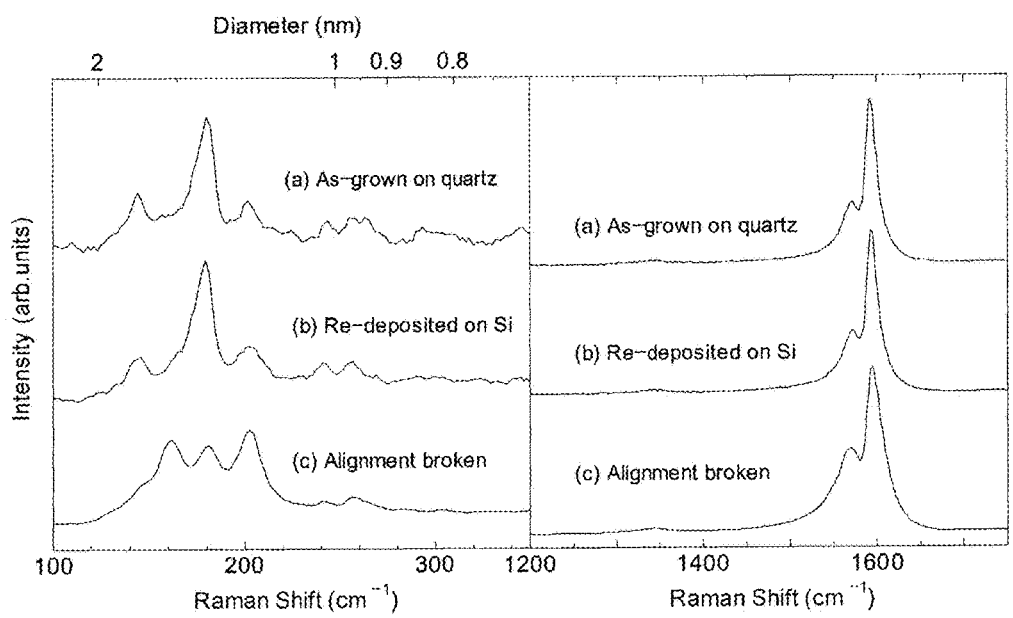
FIG. 4 is a graph showing Raman spectroscopic analysis results of a composite ("(a) As-grown on quartz") before being peeled off, composite D-1 ("(b) Re-deposited on Si") of Example 1, and Comparative Example 3 ("(c) Alignment-broken")

A Raman scattering spectrum by light having a wavelength of 488 nm and a radial breathing mode (RBM) of the single-walled carbon nanotubes for the vertically aligned single-walled carbon nanotubes on the quartz substrate were observed. The results are shown in FIG. 4(a). In FIG. 4, the right panel shows the results of the Raman scattering spectra with a light with the wavelength of 488 nm, and the left panel shows the observation result of the radial breathing mode (RBM) of single-walled carbon nanotubes. (a) "As-grown on quartz" in FIG. 4 means "the vertically aligned single-walled carbon nanotubes grown on the quartz substrate". (b) "Re-deposited on Si" means "the vertically aligned single-walled carbon nanotubes re-stuck on a silicon substrate" to be described later. Furthermore, (c) "Alignment broken" means "a sample having alignment broken by ethanol" to be described later.

FIG. 4(a) confirmed that high quality single-walled carbon nanotubes were formed since the peak of G-band in the vicinity of 1593 cm$^{-1}$ is large and the peak of D-band in the vicinity of 1340 cm$^{-1}$ is sufficiently small.

<Peel-off of Vertically Aligned Single-walled Carbon Nanotubes>

Figure 5:
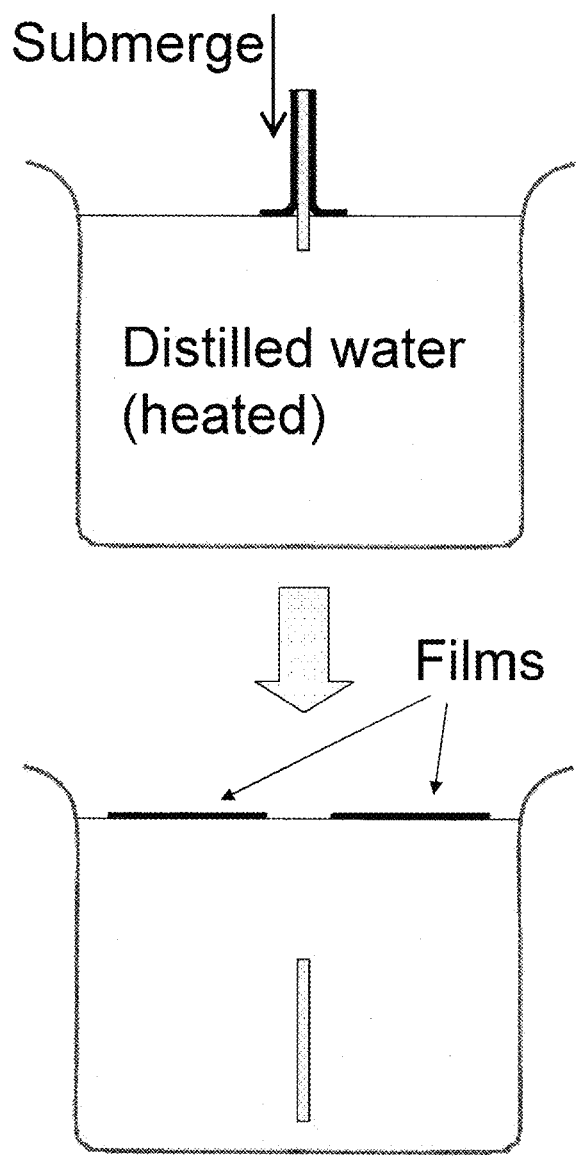
FIG. 5 is a schematic view showing a process for peeling off a vertically aligned carbon nanotube membrane B-1 from the composite A in Example 1.
Figure 6:
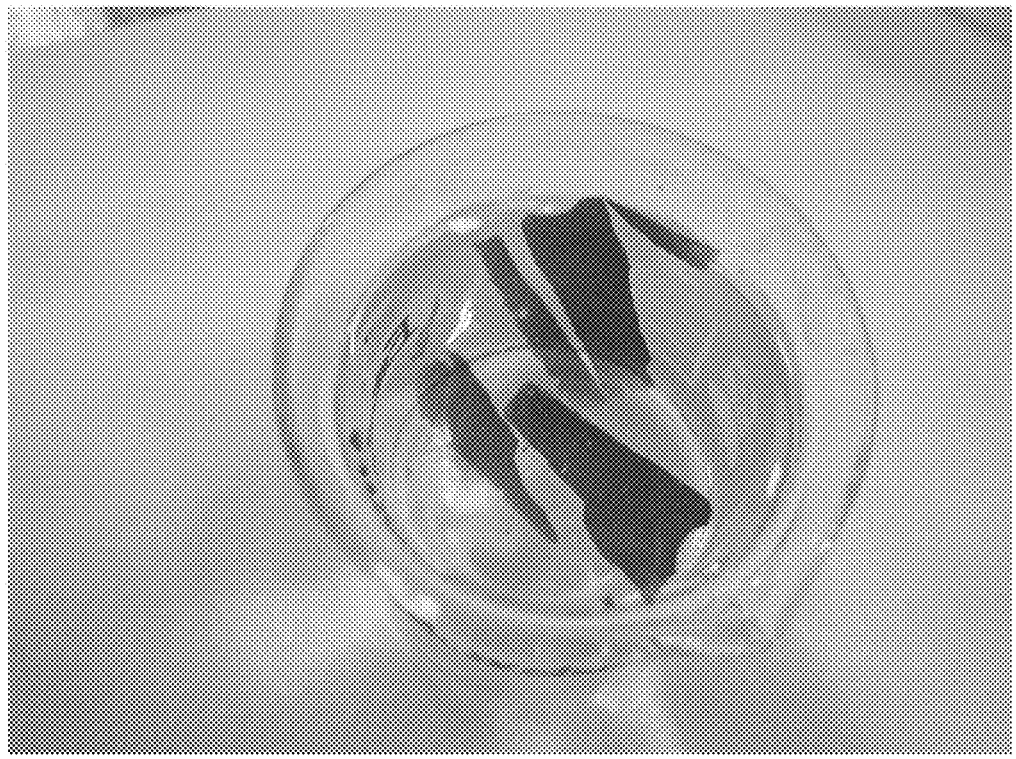
FIG. 6 shows the vertically aligned carbon nanotube membrane B-1 peeled off from the composite A in Example 1.

The vertically aligned single-walled carbon nanotubes were peeled off from the composite A obtained above. The peel-off procedure is as follows: Distilled water (Wako Pure Chemical Industries, Ltd., 047-16783) was put in a beaker, and the beaker was heated to 60° C. on a hot plate. A sample A shown in FIG. 2 and stored at a room temperature (23° C.) was sunk into warm water so that the surface on which the vertically aligned single-walled carbon nanotubes were formed was made vertical to a water surface (see the upper part of FIG. 5). As the composite A was slowly sunk into the warm water, specifically at a speed of 2 to 5 mm/s, the membranes of both sides were peeled off, and spread laterally on the water surface. As a result, a vertically aligned single-walled carbon nanotube membrane B-1 peeled was in a condition where it floated on the water surface (see the lower part of FIG. 5 and FIG. 6).

When 19 composites similarly prepared were similarly immersed in warm water of 60° C., in all the composites, the vertically aligned single-walled carbon nanotube membranes were peeled off as described above.

<Resticking of Vertically Aligned Single-walled Carbon Nanotubes (to a Different Substrate)>

Figure 7:
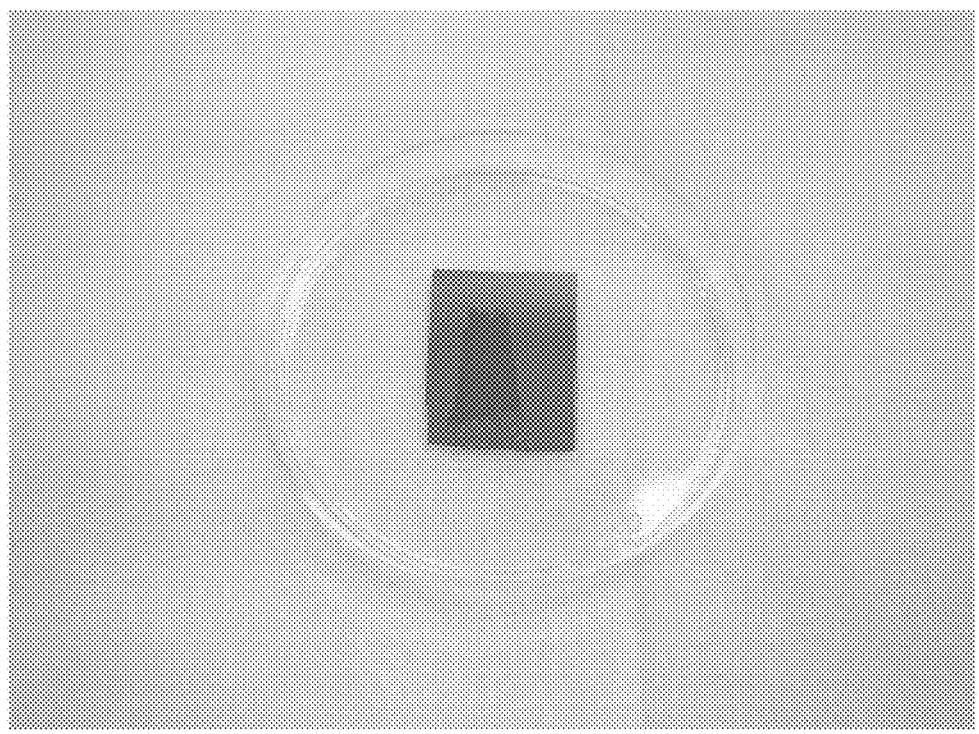
FIG. 7 shows a composite D-1 prepared in Example 1.

A silicon substrate C-1 was immersed in the beaker in which the peeled, vertically aligned single-walled carbon nanotube membrane B-1 floated on the water surface so that the surface of the substrate C-1 was made vertical to the water surface and the surface of the substrate was brought into contact with the vertically aligned single-walled carbon nanotube membrane. The substrate C-1 was then pulled up so that the vertically aligned single-walled carbon nanotube membrane was placed on the surface of the substrate. As a result, a composite D-1 in which the vertically aligned single-walled carbon nanotube membrane (area: 2 cm×1.2 cm) was formed on the silicon substrate was obtained (see FIG. 7).

Figure 3:
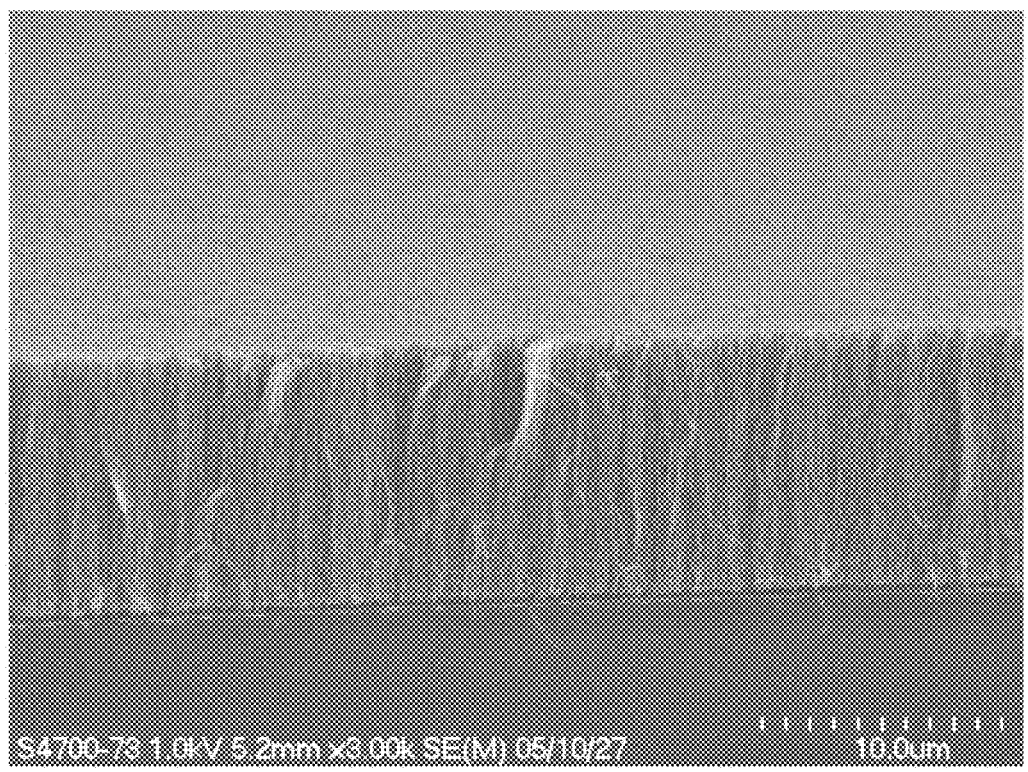
FIG. 3 shows a field-emission scanning electron microscope image of the composite A of Example 1.
Figure 8:
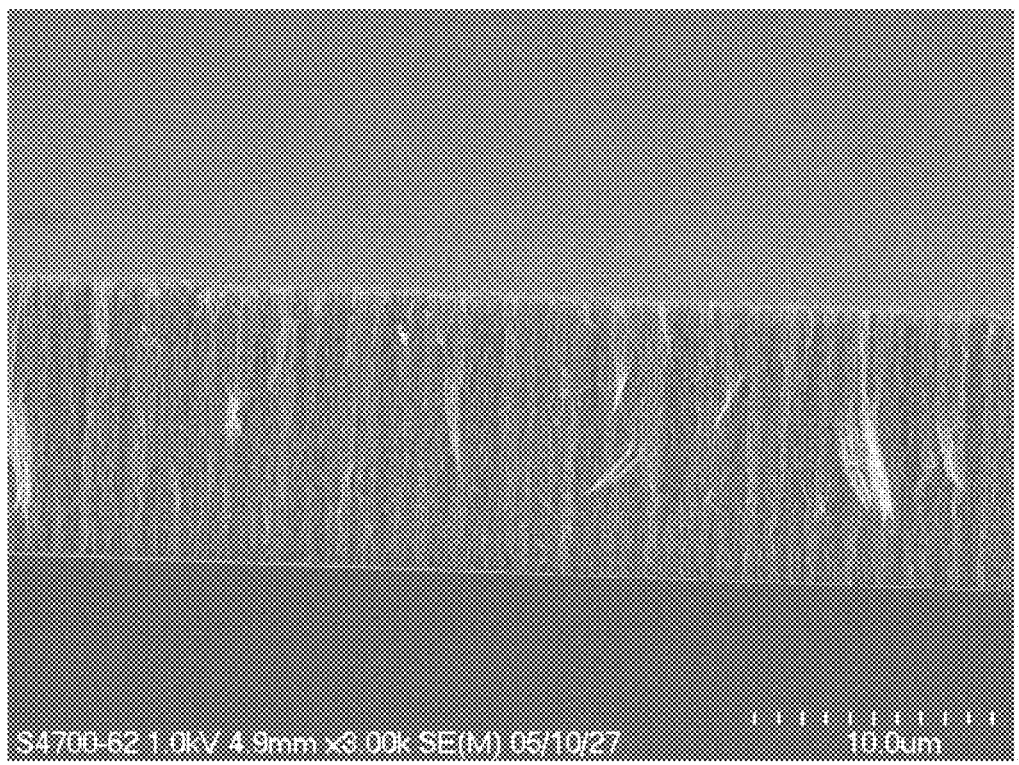
FIG. 8 shows a field-emission scanning electron microscope image of the composite D-1 prepared in Example 1.

The cross-section of the vertically aligned single-walled carbon nanotube membrane formed on the silicon substrate was observed by field-emission scanning electron microscope (FE-SEM) observed. The results are shown in FIG. 8. The comparison of FIG. 8 with FIG. 3 shows that the form of the vertical alignability before being peeled off (FIG. 3) was the same as that after being restuck (FIG. 8), and that the form is maintained. In FIGS. 3 and 8, a plurality of SWNTs is settled to serve as a bundle. Each of the fibers in the figures corresponds to a bundle having a diameter of about 5 to 20 nm.

For the vertically aligned single-walled carbon nanotube membrane on the silicon substrate, the Raman scattering spectrum and the radial breathing mode (RBM) of the single-walled carbon nanotubes were observed by light having a wavelength of 488 nm. The results are shown in FIG. 4(b).

FIG. 4(b) confirmed that the single-walled carbon nanotubes had high quality since the peak of G-band in the vicinity of 1593 cm$^{-1}$ is large and the peak of D-band in the vicinity of 1340 cm$^{-1}$ is sufficiently small. The comparison of FIG. 4(a) (before being peeled off) and FIG. 4(b) (resticking after being peeled off) shows that the shape of the peak is not changed. Further, the result of RBM on the left side of FIG. 4 shows that the shape of (a) (before being peeled off) is the same as that of (b) (resticking after being peeled off) for the peak in the vicinity of 180 cm$^{-1}$. As described later, (c) "the sample having alignment broken by ethanol" shows that the peak in the vicinity of 180 cm$^{-1}$ is reduced, the peak of (c) being different from the peaks of (a) and (b), and the sample has broken vertical alignment.

The FE-SEM image and the Raman spectroscopic analysis results show that the form of the vertically aligned single-walled carbon nanotube membrane (resticking after being peeled off) on the silicon substrate maintains the condition before being peeled off.

EXAMPLE 2

Example 2 was carried out in a manner similar to Example 1, except that the storage temperature of the composite A was set to −15° C. and the temperature of the water was set to 23° C. As a result, a vertically aligned single-walled carbon nanotube membrane B-2 was peeled off as in the vertically aligned single-walled carbon nanotube membrane B-1. There was obtained a composite D-2 in which the vertically aligned single-walled carbon nanotube membrane was formed on a silicon substrate C-2 as in the composite D-1 by using the silicon substrate C-2.

EXAMPLE 3

Example 3 was carried out in a manner similar to Example 1 (the storage temperature of the composite A is a room temperature), except that the temperature of the water was set to 90° C. As a result, a vertically aligned single-walled carbon nanotube membrane B-3 was peeled off as in the vertically aligned single-walled carbon nanotube membrane B-1. There was obtained a composite D-3 in which the vertically aligned single-walled carbon nanotube membrane was formed on a silicon substrate C-3 as in the composite D-1 by using the silicon substrate C-3.

EXAMPLE 4

Example 4 was carried out in a manner similar to Example 1 (the storage temperature of the composite A is a room temperature), except that the temperature of the water was set to 50° C. As a result, a vertically aligned single-walled carbon nanotube membrane B-4 was peeled off as in the vertically aligned single-walled carbon nanotube membrane B-1. There was obtained a composite D-4 in which the vertically aligned single-walled carbon nanotube membrane was formed on a silicon substrate C-4 as in the composite D-1 by using the silicon substrate C-4.

COMPARATIVE EXAMPLES 1 and 2

Comparative Examples 1 and 2 were carried out in a manner similar to Example 1 (the storage temperature of the composite A is a room temperature), except that the temperature of the water was set to a room temperature (Comparative Example 1) and 40° C. (Comparative Example 2).

As a result, in Comparative Example 1 (the temperature of the water: the room temperature), the peel-off of the vertically aligned single-walled carbon nanotube membrane was not observed.

Alternatively, in Comparative Example 2 (the temperature of the water: 40° C.), the local peel-off of the peripheral part of the membrane was observed. However, the peel-off as shown in Examples 1 to 4 was not observed.

Examples 1 to 4 and Comparative Examples 1 and 2 show that when the temperature ($T_w$) of the water is higher than the temperature ($T_c$) of the composite A and the temperature difference $\Delta T$ (=$T_w$−$T_c$) between the temperature ($T_w$) and the temperature ($T_c$) is 25° C. or more, the peel-off of the vertically aligned single-walled carbon nanotube membrane is observed.

COMPARATIVE EXAMPLE 3

<Sample Having Alignment Broken by Ethanol>

A composite A' was used, which was prepared as in the composite A prepared in <Preparation of composite having vertically aligned single-walled carbon nanotubes> of Example 1. The vertically aligned single-walled carbon nanotubes of this composite A' were sufficiently moistened by ethanol, and was then dried. Thereby, when the composite A' was observed using FE-SEM (not shown), the vertical alignability was broken by surface tension action in the evaporation of ethanol to form random alignment, so-called spaghetti alignment.

The Raman spectroscopic analysis was carried out for the sample having alignment broken by ethanol. The results are shown in FIG. 4(c). FIG. 4(c), in particular the left side graph shows that the peak of 180 cm$^{-1}$ is not remarkable, showing that the membrane form of the single-walled carbon nanotubes, in particular the vertical alignability can be observed from RBM.

EXAMPLE 5

Figure 9:
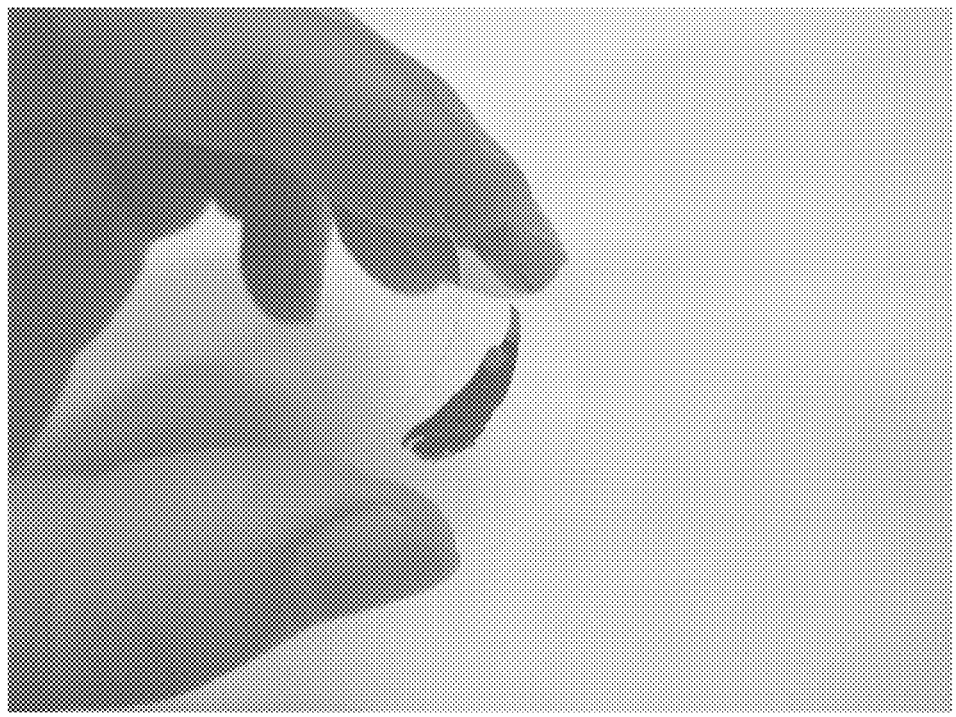
FIG. 9 shows a composite prepared in Example 5.

Example 5 was carried out in a manner similar to Example 1, except that a transparent and flexible sheet (commercially available OHP sheet) C-5 made of polyethylene terephthalate was used in place of the silicon substrate C-1. As a result, there was obtained a composite D-5 in which the vertically aligned single-walled carbon nanotube membrane was formed on a sheet C-5 made of polyethylene terephthalate as in the composite D-1 by using a sheet C-5 made of polyethylene terephthalate (see FIG. 9). The vertically aligned single-walled carbon nanotube membrane of the composite D-5 has a strong sticking strength, and the peel-off or the damage was not observed at all even after 100 bending tests in a curvature radius of 10 mm (see FIG. 9).

EXAMPLE 6

Figure 10:
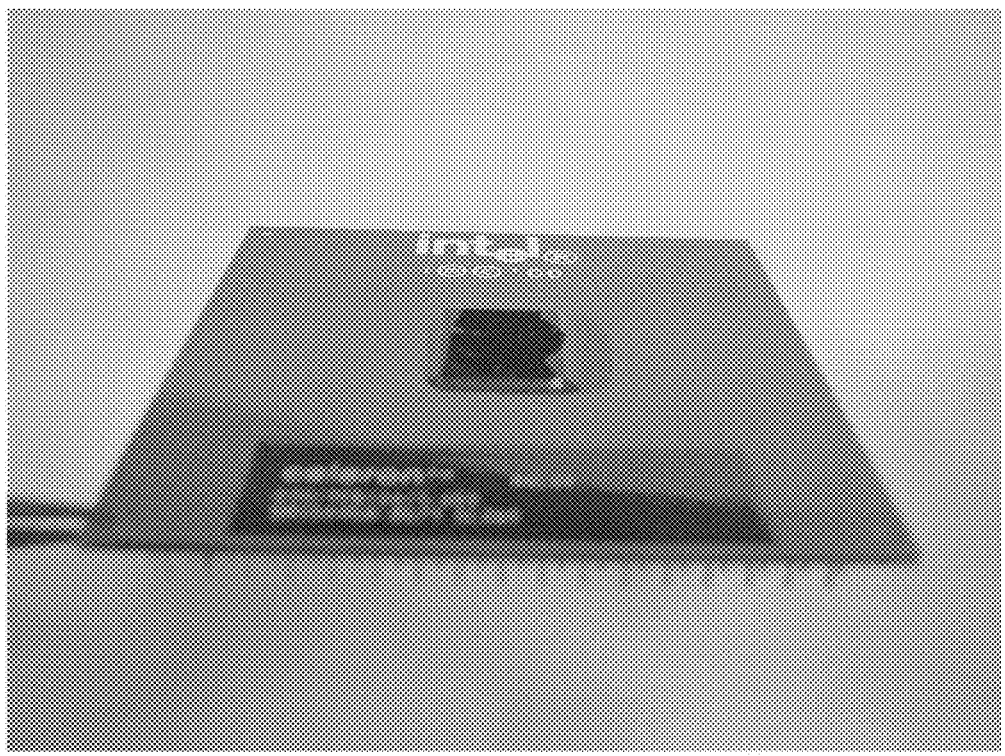
FIG. 10 shows a composite prepared in Example 6.

As shown in FIG. 10, Example 6 was carried out in a manner similar to Example 1, except that a semiconductor chip C-6 was used in place of the silicon substrate C-1. As a result, there was obtained a composite D-6 in which the vertically aligned single-walled carbon nanotube membrane was formed on the semiconductor chip C-6 as in the composite D-1 (see FIG. 10).

Examples 1, 5 and 6 show that the vertically aligned single-walled carbon nanotube membrane can be formed on all substrates regardless of a material of the substrate.

Example 6 was carried out in a manner similar to Example 1, except that the membrane thickness is changed in a range of 400 nm to 30 μm (specifically, about 400 nm, about 500 nm, about 1 μm, about 2 μm, about 3 μm, about 4 μm, about 5 μm, about 6 μm, about 8 μm, about 10 μm, about 12 μm, about 15 μm, about 20 μm and about 30 μm), and thereby to obtain composites in each of which the vertically aligned single-walled carbon nanotube membrane was formed on the silicon substrate.

EXAMPLE 7

<Preparation of Freestanding Membrane>

Figure 11:
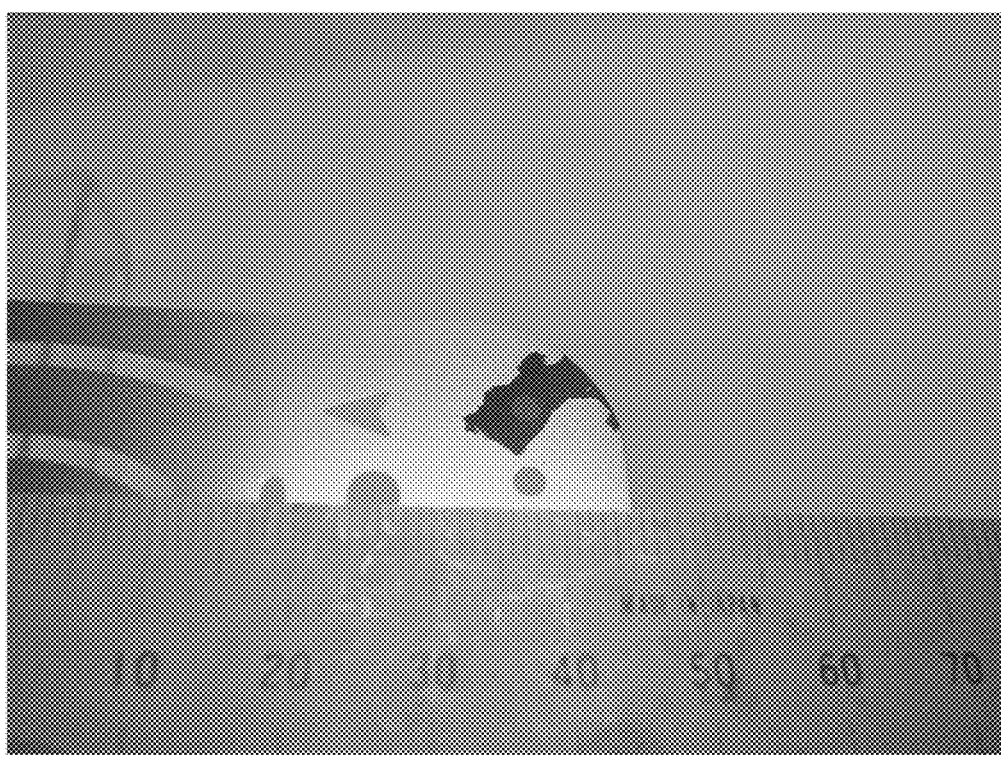
FIG. 11 shows a freestanding membrane prepared in Example 7.

As shown in FIG. 11, Example 7 was carried out in a manner similar to Example 1, except that a support member C-7 having a hole having a diameter of about 2.5 mm was used in place of the silicon substrate C-1. As a result, there was formed a freestanding membrane E-1 having a diameter of about 2.5 mm and a membrane thickness of about 15 μm (equivalent circle diameter/thickness=167) by using a support member C-7 having the hole having the diameter of about 2.5 mm (see FIG. 11).

Content element analysis was carried out by XPS (X-ray photoemission spectroscopy) for the freestanding membrane E-1. As a result, the amounts of fluoride (F) and chlorine (Cl) were below the analysis limit. Alternatively, the amount of Silicon (Si) was 6 ppm.

These results show that the freestanding membrane consisting of the vertically aligned carbon nanotubes can be formed by the present invention. Alternatively, the freestanding membrane was free from silicon and halogen.

Since the freestanding membrane E-1 is free from silicon and halogen, this shows that the vertically aligned carbon nanotube membranes of the composites obtained in Examples described above are also free from silicon and halogen.

What is claimed is that:

1. A process for producing a freestanding membrane consisting of vertically aligned carbon nanotubes, comprising the steps of:
   (a) preparing a composite comprising a substrate and vertically aligned carbon nanotubes formed on the substrate; and
   (b) immersing the composite in water wherein a temperature ($T_W$) of the water is higher than a temperature ($T_c$) of the composite with a temperature difference $\Delta T$ ($=T_W-T_c$) between the temperature ($T_W$) and the temperature ($T_c$) being 25° C. or more to peel off the vertically aligned carbon nanotubes from the composite to obtain the freestanding membrane.

2. The process according to claim 1, wherein the step (b) comprises the step of forming the freestanding membrane so that the freestanding membrane is partially supported by a support member.

3. The process according to claim 1, wherein the freestanding membrane has a thickness of 200 nm to 500 μm.

4. The process according to claim 1, wherein a ratio r/d of a diameter r of a circle to a thickness d of the freestanding membrane is 10 or more, the circle being calculated for the freestanding membrane and having an area equivalent to that of the freestanding membrane.

5. The process according to claim 1, wherein the form of the vertically aligned carbon nanotubes in the freestanding membrane substantially maintains that of the vertically aligned carbon nanotubes in the composite.

6. The process according to claim 1, wherein the freestanding membrane is free from silicon (Si).

7. The process according to claim 1, wherein the carbon nanotubes are multi-walled carbon nanotubes and/or single-walled carbon nanotubes.

8. The process according to claim 1, wherein the carbon nanotubes are single-walled carbon nanotubes.

9. The process according to claim 1, wherein the freestanding membrane is free from halogen.

10. The process according to claim 9, wherein the halogen is fluoride, and the freestanding membrane has fluoride of 100 ppm or less.

11. The process according to claim 9, wherein the halogen is chlorine, and the freestanding membrane has chlorine of 100 ppm or less.

12. A process for peeling off vertically aligned carbon nanotubes from a substrate, comprising the steps of:
   (a) preparing a composite comprising the substrate and the vertically aligned carbon nanotubes formed on the substrate; and
   (b) immersing the composite in water wherein a temperature ($T_W$) of the water is higher than a temperature ($T_c$) of the composite with a temperature difference $\Delta T$ ($=T_W-T_c$) between the temperature ($T_W$) and the temperature ($T_c$) being 25° C. or more to peel off the carbon nanotubes from the composite.

13. The process according to claim 12, wherein the vertically aligned carbon nanotubes peeled have a thickness of 200 nm to 500 μm.

14. The process according to claim 12, wherein the form of the vertically aligned carbon nanotubes peeled substantially maintains the form of the vertically aligned carbon nanotubes in the composite.

15. The process according to claim 12, wherein the vertically aligned carbon nanotubes peeled are free from silicon (Si).

16. The process according to claim 12, wherein the carbon nanotubes are multi-walled carbon nanotubes and/or single-walled carbon nanotubes.

17. The process according to claim 12, wherein the carbon nanotubes are single-walled carbon nanotubes.

18. The process according to claim 12, wherein the vertically aligned carbon nanotubes peeled are free from halogen.

19. The process according to claim 18, wherein the halogen is fluoride, and the vertically aligned carbon nanotubes peeled have fluoride of 100 ppm or less.

20. The process according to claim 18, wherein the halogen is chlorine, and the vertically aligned carbon nanotubes peeled have chlorine of 100 ppm or less.

21. A process for producing a first composite comprising a first substrate and vertically aligned carbon nanotubes formed on the first substrate, comprising the steps of:
   (a) preparing a second composite comprising a second substrate made of quartz or silicon and vertically aligned carbon nanotubes formed on the second substrate;
   (b) immersing the second composite in water wherein a temperature ($T_W$) of the water is higher than a temperature ($T_c$) of the second composite with a temperature difference $\Delta T$ ($=T_W-T_c$) between the temperature ($T_W$) and the temperature ($T_c$) being 25° C. or more to peel off the vertically aligned carbon nanotubes from the second substrate, and arranging the vertically aligned carbon nanotubes in the water or on the surface of the water; and
   (c) placing the vertically aligned carbon nanotubes peeled on the first substrate to form the vertically aligned carbon nanotubes on the first substrate.

22. The process according to claim 21, wherein the first substrate is made of a material excluding a material consisting of quartz or a material consisting of silicon.

23. The process according to claim 21, wherein the form of the vertically aligned carbon nanotubes in the first composite substantially maintains the form of the vertically aligned carbon nanotubes in the second composite.

24. The process according to claim 21, wherein the vertically aligned carbon nanotubes have a thickness of 200 nm to 500 μm.

25. The process according to claim 21, wherein the first composite is free from silicon (Si).

26. The process according to claim 21, wherein the carbon nanotubes are multi-walled carbon nanotubes and/or single-walled carbon nanotubes.

27. The process according to claim 21, wherein the carbon nanotubes are single-walled carbon nanotubes.

28. The process according to claim 21, wherein the first composite is free from halogen.

29. The process according to claim 28, wherein the halogen is fluoride, and the first composite has fluoride of 100 ppm or less.

30. The process according to claim 28, wherein the halogen is chlorine, and the first composite has chlorine of 100 ppm or less.

* * * * *